(12) United States Patent
Gosselin-Harris et al.

(10) Patent No.: US 10,608,954 B2
(45) Date of Patent: Mar. 31, 2020

(54) HIERARCHICAL RESOURCE TREE ALLOCATION

(71) Applicant: Ciena Corporation, Hanover, MD (US)

(72) Inventors: Kyle Gosselin-Harris, Greenacres, WA (US); David Gilson, Honolulu, HI (US)

(73) Assignee: Ciena Corporation, Hanover, MD (US)

( * ) Notice: Subject to any disclaimer, the term of this patent is extended or adjusted under 35 U.S.C. 154(b) by 660 days.

(21) Appl. No.: 15/068,217

(22) Filed: Mar. 11, 2016

(65) Prior Publication Data

US 2017/0264565 A1 Sep. 14, 2017

(51) Int. Cl.
*H04L 12/911* (2013.01)
(52) U.S. Cl.
CPC .................. *H04L 47/782* (2013.01)
(58) Field of Classification Search
CPC .................................................. H04L 47/782
See application file for complete search history.

(56) References Cited

U.S. PATENT DOCUMENTS

| 6,826,570 | B1 * | 11/2004 | Eshel | G06F 16/1774 |
| 8,060,883 | B1 * | 11/2011 | Rao | G06F 9/5077 |
| | | | | 709/226 |
| 9,203,746 | B2 | 12/2015 | Gilson et al. | |
| 2009/0006402 | A1 * | 1/2009 | Bohle | G06F 9/526 |
| 2013/0055279 | A1 * | 2/2013 | Sistare | G06F 9/50 |
| | | | | 718/104 |

* cited by examiner

*Primary Examiner* — Chris Parry
*Assistant Examiner* — Albert Chiou
(74) *Attorney, Agent, or Firm* — Clements Bernard Walker; Christopher L. Bernard; Lawrence A. Baratta, Jr.

(57) ABSTRACT

A method for resource management includes receiving, from a client, an allocation request for a resource, and assigning, to the client, a partition of a hierarchical resource tree. The partition is in multiple partitions of the hierarchical resource tree. The method further includes identifying a deallocated resource in the partition, and allocating, to the client, the first deallocated resource from the partition to create an allocated resource.

16 Claims, 7 Drawing Sheets

HIERARCHICAL RESOURCE TREE ALLOCATION

BACKGROUND

In computing systems, resources are shared amongst clients by allocating resources to a client and deallocating the resources when the resources are no longer being used by the client. While the resources are allocated to a client, the client has exclusive use of the resource. When the resource is deallocated, the resource is available for use by other clients. In order to allocate and deallocate resources, locking mechanisms, such as software locks (e.g., semaphores, mutex, etc.) and/or hardware locks are used so that the clients of the computing system do not receive the same resources.

SUMMARY

In general, in one aspect, one or more embodiments relate to a method for resource management that includes receiving, from a client, an allocation request for a resource, and assigning, to the client, a partition of a hierarchical resource tree. The partition is in multiple partitions of the hierarchical resource tree. The method further includes identifying a deallocated resource in the partition, and allocating, to the client, the deallocated resource from the partition to create an allocated resource.

In general, in one aspect, one or more embodiments relate to a system for resource management that includes resources, a data repository configured to store a hierarchical resource tree. The hierarchical resource tree is partitioned into a multiple partitions. The system further includes a computer processor operatively connected to the resources and the data repository. The computer processor is receive, from a client, an allocation request for a resource, and assign, to the client, a partition of the hierarchical resource tree. The partition is in multiple partitions of the hierarchical resource tree. The computer processor is further configured to identify a deallocated resource in the first partition, and allocate, to the client, the deallocated resource from the partition to create an allocated resource.

In general, in one aspect, one or more embodiments relate to a non-transitory computer readable medium for resource management that includes computer readable program code. The computer readable program code is for receiving, from a client, an allocation request for a resource, and assigning, to the client, a partition of a hierarchical resource tree. The partition is in multiple partitions of the hierarchical resource tree. The computer readable program code is further for identifying a deallocated resource in the partition, and allocating, to the client, the deallocated resource from the partition to create an allocated resource.

Other aspects of the invention will be apparent from the following description and the appended claims.

BRIEF DESCRIPTION OF DRAWINGS

FIGS. 7.1 and 7.2 show an example in accordance with one or more embodiments of the invention.

FIGS. 8.1 and 8.2 shows a computing system in accordance with one or more embodiments of the invention.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention partition a hierarchical resource tree into multiple partitions. Each partition has a disjoint set of resources that may be allocated. In other words, the resources in one partition are different instances of resources that may be allocated to another partition. Further, one or more embodiments assign each client requesting allocation of resources to a partition. In one or more embodiments, the assignment of clients to partitions is static (i.e., a given client always maps to the same partition). In one or more embodiments, the assignment may be dynamic (i.e., a given client may sometimes map to one partition, then at some time in the future map to a different partition). Clients are allocated resources only from the partition to which the client is assigned. In some embodiments, a partition is assigned to a single client. In such a scenario, allocation of resources to the client may be performed without using any hardware or software locking mechanism. In other embodiments, two or more clients may be assigned to the same partition. In such embodiments, the number of clients allocated to the same partition is less than the number of clients of the computing system. Thus, one or more embodiments may increase the speed at which the clients gain access to the resources, and, thus, increase the speed of the computing system.

Figure 1:
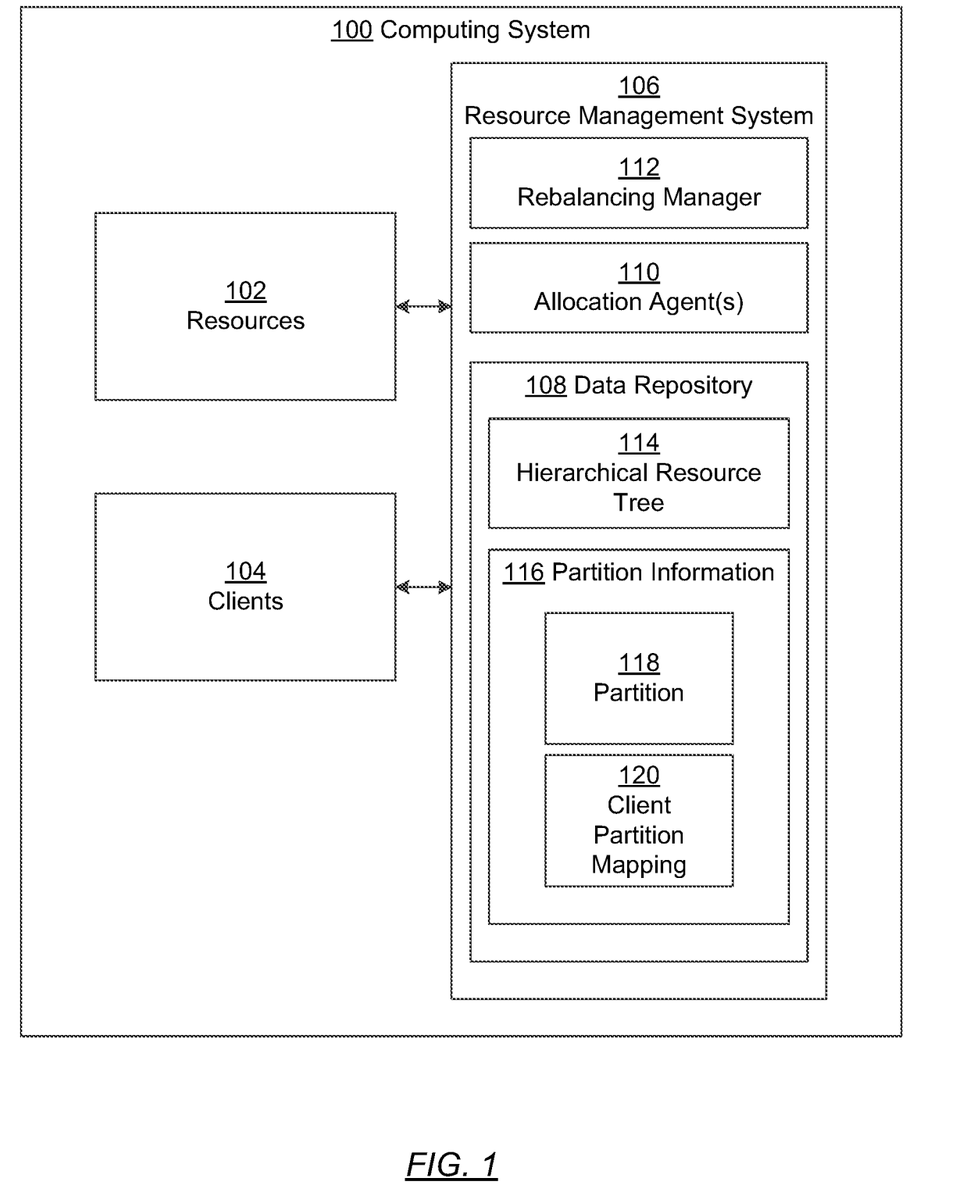
FIGS. 1 and 2 show diagrams of a system in accordance with one or more embodiments of the invention.
Figure 81:
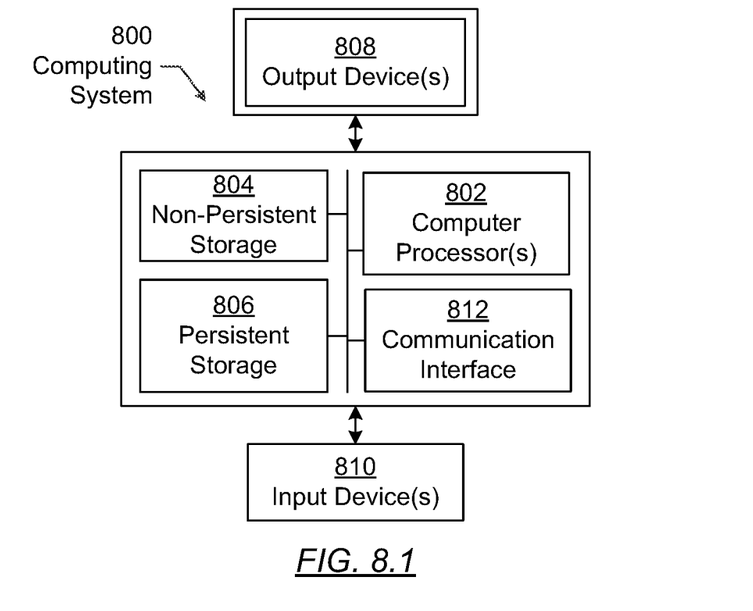
Figure 82:
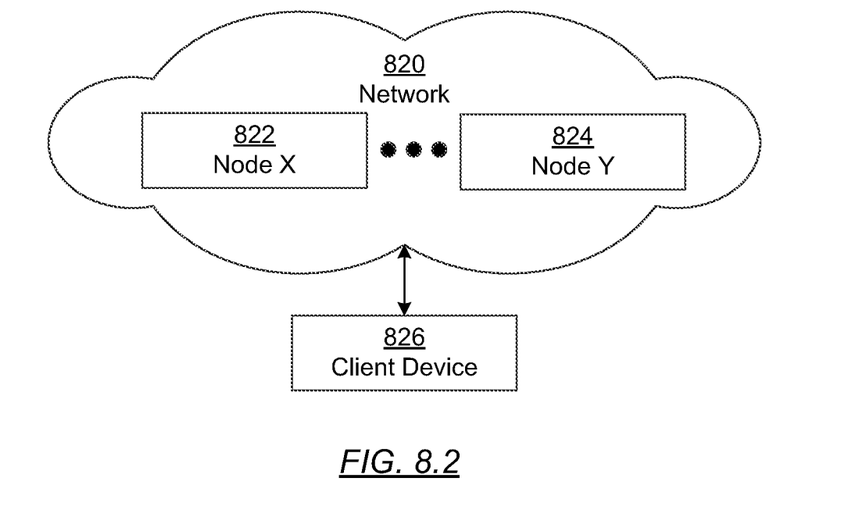

FIG. 1 shows a computing system (100) in accordance with one or more embodiments of the invention. Example computing systems (100) that may be used to implement one or more embodiments of the invention are described below with reference to FIGS. 8.1 and 8.2. As shown in FIG. 1, the computing system (100) includes resources (102), clients (104), and a resource management system (106). Each of these components are described below.

The resources (102) are hardware resources and/or software of the computing system (100). For example, the resources (102) may be entries in a table (e.g., virtual local area network (VLAN) table), hardware chip table entries, computing-resources, memory, processing units, entries in a ternary content-addressable memory (TCAM), ports, bandwidth, and/or other resources. In one or more embodiments, the resources (102) are the resources of a multi-level switch assembly system. For example, the resources may span a multi-chassis system having multiple chassis, with each chassis having multiple line blades.

In one or more embodiments of the invention, the resources (102) are shared amongst multiple clients (104). Each client is a distinct entity that requests access to a resource. For example, a client may be a software application thread, a software application, a switching system in a virtual machine, or another requester of exclusive access to resources. In one or more embodiments, each client has a distinct and individual execution context.

In one or more embodiments of the invention, the clients (102) and resources (102) are operatively connected to a resource management system (106). In particular, the resource management system (106) includes functionality to manage access to the resources (102) on the computing system (100). The resource management system (106) may include functionality to detect the resources (102) on the computing system (100), such as via hardware, firmware, device drives, etc. In such a scenario, the resource management system (106) may obtain information describing the resources (102) based on the detection. In some embodiments, the resource management system (106) may include functionality to obtain information describing the resources (102) from a file or other repository. The file or other repository may be populated by another entity (not shown). The resource management system (106) includes a data repository (108), allocation agent(s) (110), and a rebalancing manager (102).

In one or more embodiments of the invention, the data repository (108) is any type of storage unit and/or device (e.g., a file system, database, collection of tables, or any other storage mechanism) for storing data. Further, the data repository (108) may include multiple different storage units and/or devices. The multiple different storage units and/or devices may or may not be of the same type or located at the same physical site. The data repository (108) includes functionality to store a hierarchical resource tree (114) and partition information (116).

In general, a hierarchical resource tree (114) is an organization of data for maintaining information about resources (102) on the computing system (100). In other words, the hierarchical resource tree (114) tracks hierarchical relationships between resources on the computing system. Different types of software, firmware, and/or hardware data structures may be used to maintain the hierarchical resource tree (114). The hierarchical resource tree (114) is discussed below in reference to FIG. 2.

Figure 2:
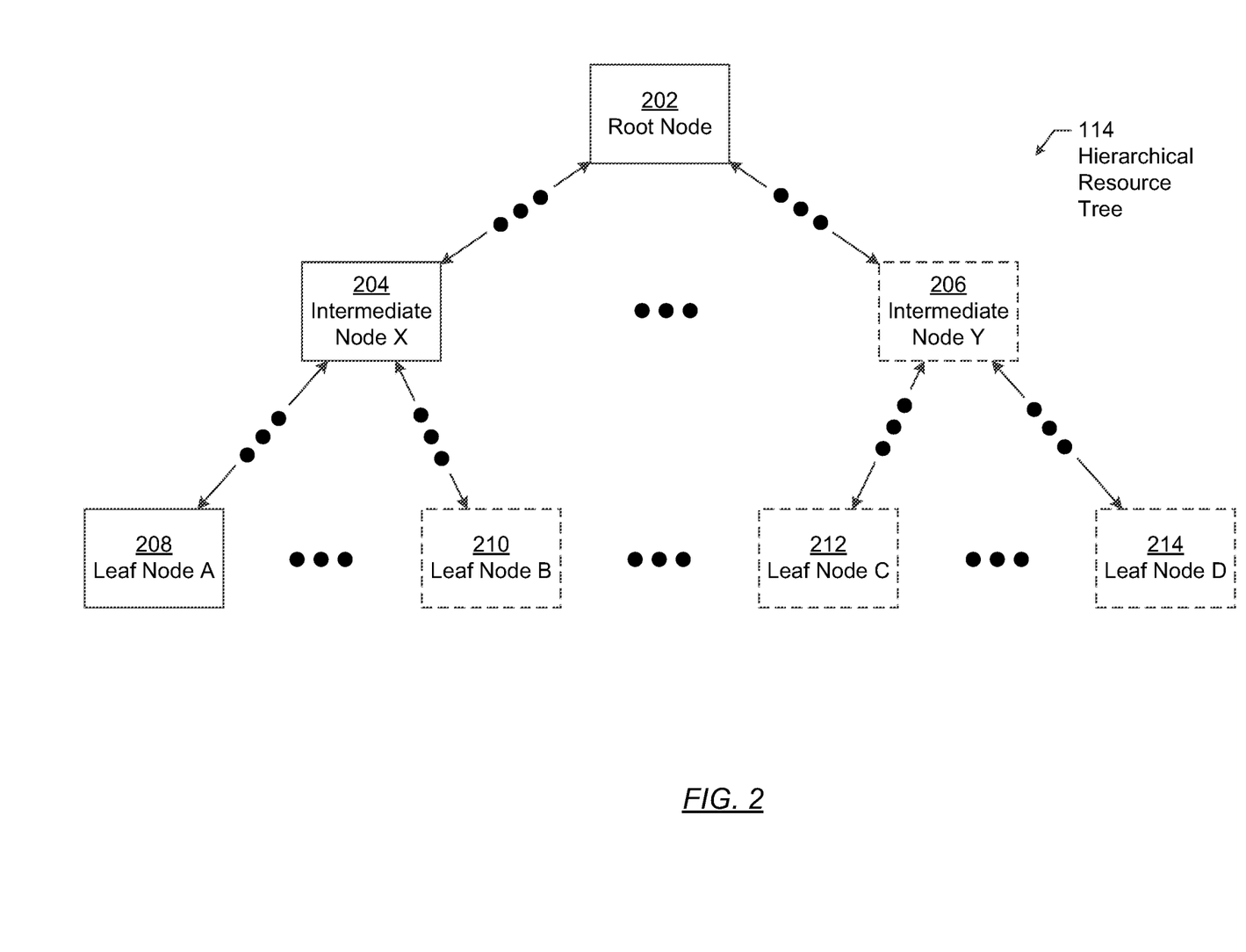

As shown in FIG. 2, the hierarchical resource tree (114) includes nodes. Each node is represents an entity or set of entities on the computing system. The entity represented by the node may be a physical entity (e.g., hardware), software entity (e.g., virtual machine), or another entity (e.g., customer). The nodes include a root node (202), one or more intermediate nodes (e.g., intermediate node X (204), intermediate node Y (206)), and one or more leaf nodes (e.g., leaf node A (208), leaf node B (210), leaf node C (212), leaf node D (214)). Relationships between nodes are ordered by inclusion in accordance with one or more embodiments of the invention. For example, the physical entity represented by the root node includes the physical entity or entities represented by the one or more intermediate nodes. Similarly, in the example, the physical entity represented by intermediate nodes includes the physical entity or entities that are leaf nodes and/or intermediate nodes that are child (ren) node(s) of the intermediate nodes.

By way of a more concrete example, the root node may represent a multi-chassis system, a level of intermediate nodes may represent the chassis that are included in the multi-chassis system. Intermediate nodes that are children of the intermediate node representing the chassis may be the line blades in the chassis. Leaf nodes that are children of the intermediate node representing a line blade may be the resources in the line blade. In some embodiments, the physical entities represented by the root node or intermediate nodes may be resources that may be allocated to a client. In some embodiments, only the physical entities that are represented by leaf nodes are resources that may be allocated to a client.

Resources represented by the nodes in the hierarchical resource tree are shared amongst the clients in the computing system. In other words, each client may use each resource represented by the hierarchical resource tree. Thus, the nodes that represent resources may have an allocated state (i.e., allocated) and a deallocated state (i.e., deallocated). When a node corresponding to a resource has an allocated state, the resource is allocated to a client. Thus, the client may have exclusive access to the resource. When a node corresponding to a resource has a deallocated state, the resource is not allocated to any client. For example, the resource may have been allocated to a client and is no longer allocated to the client. By way of another example, the resource may never have been allocated to a client. Thus, the resource is available for allocation.

Further, multiple hierarchical resource trees may exists, whereby each hierarchical resource tree is for a distinct type of resource. For example, a hierarchical resource tree may exist for bandwidth, a distinct hierarchical resource tree may exist for entries in a TCAM, and a distinct hierarchical resource tree may exist for each routing and forwarding table to allocate entries. In one or more embodiments, groups of resources that are allocated together may be grouped in a single hierarchical resource tree. For example, a group of routing and forwarding tables may be represented by a single hierarchical resource tree, whereby leaf nodes in the tree are a set of entries in each routing and forwarding table on the computing system.

Returning to FIG. 1, the hierarchical resource tree (114) may be partitioned into distinct partitions (118) which are maintained as at least part of partition information (116). In other words, each partition (118) may have a portion of the resources represented by the hierarchical resource tree (114). In one or more embodiments, a partition (118) may be a subtree of the hierarchical resource tree (114). In such a scenario, a partition may include a portion of the nodes, where the nodes may be complete nodes and only a strict subset of the nodes are in the partition. By way of an example, if the hierarchical resource tree is for a multi-chassis system, then a partition may be the set or strict subset of resources on a particular line blade. In one or more embodiments, a partition may be a copy of the hierarchical resource tree, with the nodes representing the resources reduced to represent a partition of the resources. By way of an example, a partition of the hierarchical resource tree may have the same root node and intermediate nodes as the hierarchical resource tree, and the same number of leaf nodes, but each leaf node may be a partition of the corresponding leaf node in the hierarchical resource tree. Thus, for example, if a leaf node of the hierarchical resource tree represents a TCAM having 80 entries, the leaf nodes of each of 4 partitions may represent 20 entries that do not overlap with the other partitions.

Although FIG. 1 shows the data repository (108) storing the hierarchical resource tree (114) and partitions (118), other additional or alternative storage techniques may be used without departing from the scope of the invention. For example, the hierarchical resource tree (114) may be stored with a partition to node mapping. In such a scenario, the mapping is a filter when accessing the hierarchical resource tree, whereby only nodes or portions thereof assigned to the partition are viewable. By way of another example, each node in the hierarchical resource tree may have one or more partition identifier stored with the node, whereby the partition identifier stores the identifier of the partition to which the node is assigned. By way of another example, the storage of the partitions may replace storing the hierarchical resource tree. In other words, rather than storing the entire hierarchical resource tree, only the partitions may be stored in such embodiments. The above embodiments are a few examples of how the data repository may maintain the partitions. The embodiments may be combined or changed without departing from the scope of the invention.

The partition information (116) may include client partition mapping (120) in accordance with one or more embodiments of the invention. The client partition mapping (120) stores a relationship between the partitions (118) and the clients (104). In one or more embodiments, the client partition mapping (120) is a one-to-one mapping of clients (104) to partitions (118). In one or more embodiments, the client partition mapping (120) is a many-to-one mapping of clients (104) to partitions (118). In other words, a strict subset of the clients (104) that are allocated resources or are requesting allocation may be assigned to the same partition. In such embodiments, the partitions may have one or more priority for the partition that specifies the priority(ies) of clients assigned to the partition. Thus, clients assigned to the partition may have the same, or within a threshold level of each other, priority.

In one or more embodiments, the client partition mapping (120) may be a one-to-many or many-to-many mapping of clients (104) to partitions (118) without departing from the scope of the invention. Further, the number of clients/partitions in a single mapping may change during execution.

In one or more embodiments of the invention, the allocation agents (110) correspond to hardware, software, firmware, or a combination thereof that includes functionality to assign clients (104) to partitions (118) and allocate resources (102) to clients (104) using the partitions (118). For example, the allocation agents (110) may be hardware or software threads executing on a controller device of the computing system (100). Further, a distinct allocation agent (110) may exist for each partition (118). In one or more embodiments, the allocation agent(s) are libraries or similar software components that execute in the client's context. In one or more embodiments, the allocation agent(s) are separate execution contexts that service client requests by way of a communication channel or similar distributed mechanism.

In one or more embodiments of the invention, the rebalancing manager (102) correspond to hardware, software, firmware, or a combination thereof that includes functionality to create partitions (118) of the hierarchical resource tree and rebalance the partitions based on usage of the partitions (118). Rebalancing the partitions involves changing which resources are assigned to partitions and/or which clients are assigned to partitions based on the number or amount of deallocated resources are in the partition as compared to other partitions. For example, the rebalancing manager (102) may be one or more hardware and/or software threads executing on a controller device of the computing system (100).

While FIGS. 1 and 2 show a configuration of components, other configurations may be used without departing from the scope of the invention. For example, various components may be combined to create a single component. As another example, the functionality performed by a single component may be performed by two or more components.

FIGS. 3-6 show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

Figure 3:
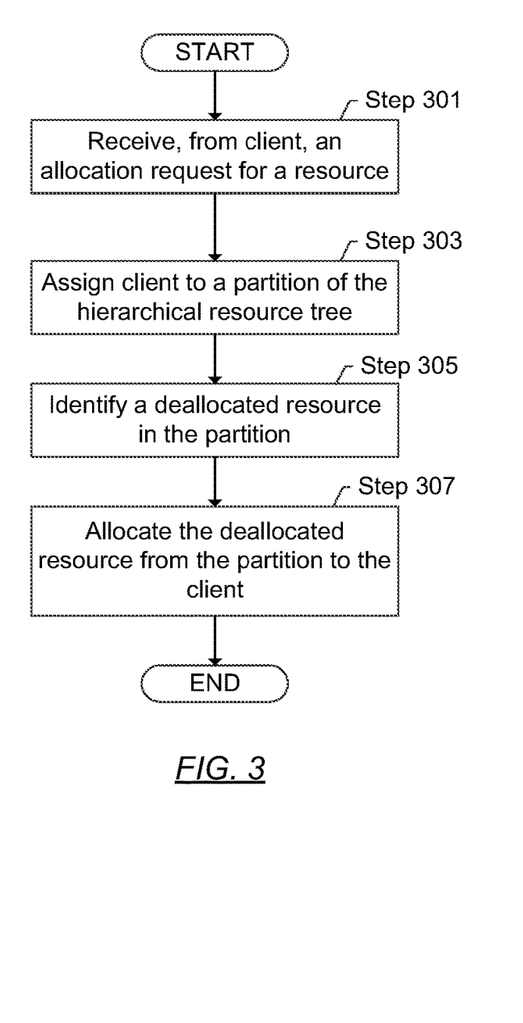
FIGS. 3, 4, 5, and 6 show flowcharts in accordance with one or more embodiments of the invention.

FIG. 3 shows a flowchart for allocating resources to clients in accordance with one or more embodiments of the invention. FIG. 3 may be performed, for example, by an allocation agent. Further, FIG. 3 may be performed when the client is not assigned to a partition. In Step 301, an allocation request is received from a client in accordance with one or more embodiments of the invention. In particular, the client sends, directly or indirectly, the allocation request to the resource management system. To the client, the operations of the resource management system are hidden. Thus, the client may be unable to identify the existence of the partitions. In such a scenario, the allocation requests may be allocation requests that are used in the art. In some embodiments, the allocation requests may be modified based on the usage of partitions.

In Step 303, the client is assigned to a partition of the hierarchical resource tree in accordance with one or more embodiments of the invention. For example, when the allocation agent receives the allocation request, the allocation agent may determine that the client is not yet assigned to a partition. The determination may be performed by extracting an identifier of the client (i.e., client identifier) from the allocation request and querying the client partition mapping with the client identifier. If the client identifier is not in the client partition mapping or is not assigned to a partition, the allocation agent determines that the client is not assigned to a partition. By way of another example, the allocation agent may extract the client identifier and compare the client identifier with a separate list of clients which are assigned to partitions.

When the client is not assigned to a partition, the number of clients assigned to each partition may be determined. The client may then be assigned to the partition having the lowest number of clients assigned to the partition in one or more embodiments. In one or more embodiments, the priority level of the client may be determined based on the client identifier. The priority level of the client may be compared against the priority level of each partition to identify the partition having the matching priority levels. When a match is found the client is assigned to the partition. The assignment may be stored by storing a relationship in the client partition mapping between the client identifier and partition identifier. Other techniques identifying the partition to assign a client and assigning the client to a partition may be used without departing from the scope of the invention.

In Step 305, a deallocated resource in the partition is identified in accordance with one or more embodiments of the invention. In one or more embodiments of the invention, the allocation agent searches the partition assigned to the client to identify at least one deallocated resource that matches the request. Identifying the at least one deallocated resource may include identifying whether the node corresponding to the resource indicates an allocated state or a deallocated state for the resource.

In Step 307, the identified deallocated resource is allocated from the partition to the client to obtain an allocated resource in accordance with one or more embodiments of the invention. In other words, the allocation state of the resource may be set in the node. Further, the client or another entity may be notified of the resource that is allocated to the client. Thus, the client may use the resource.

If the client is the only client assigned to the partition, then a locking mechanism (e.g., software and/or hardware lock) is not required and may not be used to identify deallocated resources and allocate the resources. Thus, allocating resources using hierarchical resource tree is not a bottleneck for the client. If the client is one of many clients assigned to a partition, then a locking mechanism may be employed prior to allocating the deallocated resource. The locking mechanism may be limited to a lock on the partition. In other words, the allocation agent may acquire a lock on the partition rather than the entire hierarchical resource tree prior to allocating the deallocated resource. Because only a subset of clients is assigned to the partition, the bottleneck may be minimized even when a lock is used. In other words, one or more embodiments may concurrently allocate resources to multiple clients whereby each client is assigned a separate partition of the hierarchical resource tree.

Figure 4:
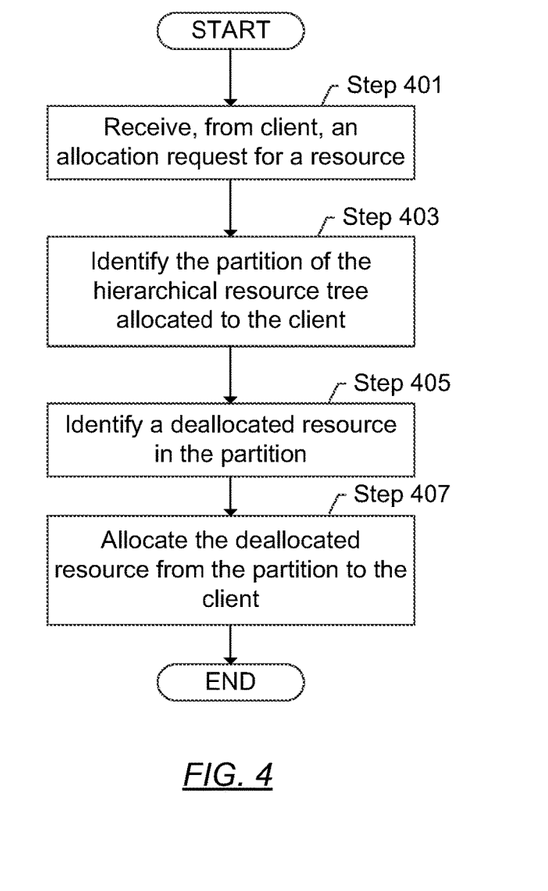

Turning to FIG. 4, FIG. 4 shows a flowchart for processing an allocation request when the client is assigned to a partition in accordance with one or more embodiments of the invention. FIG. 4 may be performed, for example, by an allocation agent. Further, FIG. 4 may be performed when the client is not assigned to a partition. In Step 401, an allocation request is received from a client in accordance with one or more embodiments of the invention. Receiving the allocation request may be performed as discussed above with reference to Step 301 of FIG. 3.

In Step 403, the partition of the hierarchical resource tree to which the client is assigned is identified in accordance with one or more embodiments of the invention. The identification may be performed by extracting the client identifier of the client from the allocation request and querying the client partition mapping with the client identifier. The result of the query may be the partition identifier.

In Step 405, a deallocated resource in the partition is identified in accordance with one or more embodiments of the invention. In Step 407, the identified deallocated resource is allocated from the partition to the client to obtain an allocated resource in accordance with one or more embodiments of the invention. Steps 405 and 407 may be performed in a same or similar manner as discussed above with reference to Step 305 and 307.

Although FIGS. 3 and 4 shows the allocation request as being for a resource, the allocation request may be for multiple resources.

Figure 5:
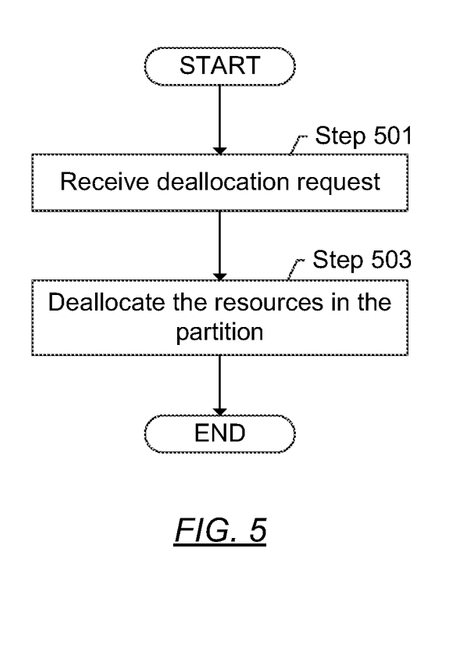

Turning to FIG. 5, when the client has completed using the resource, the resource is deallocated and may be used by other clients. FIG. 5 shows a flowchart for deallocating resources. In Step 501, a deallocation request is received in accordance with one or more embodiments of the invention. The deallocation request may be received, directly or indirectly, from the client, a garbage collector, or another entity on the computing system. In Step 503, the resources in the partition are deallocated. In other words, the deallocation state in the node in the partition corresponding to the resources in the deallocation request is set.

Over time, the allocation and deallocation of resources by different clients may have different usage patterns. Thus, some partitions may be used more than other partitions and have more resources allocated to clients in the partition than the other partitions. Because of the different usage patterns, a client may be blocked from executing because resources are not available in the client's partitions even though the resources are available in other partitions. A rebalancing manager may rebalance the partitions to accommodate different usage patterns.

Figure 6:
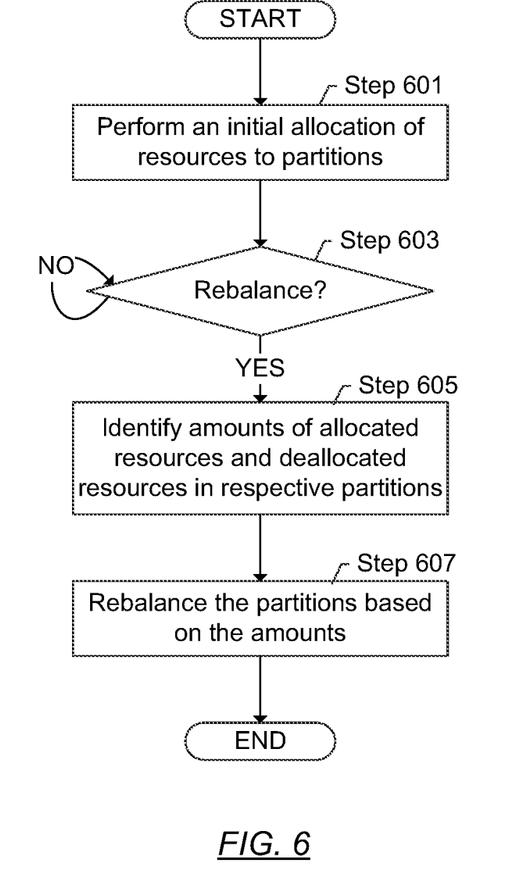

In Step 601, an initial allocation of resources to partitions is performed in accordance with one or more embodiments of the invention. For example, the initial allocation may be an even allocation, whereby the partitions are the same size or within a threshold of the same size. By way of another example, the initial allocation may be based on priority levels, such that higher priority partitions have more resources than lower priority partitions. By way of another example, partitions may be generated as clients send initial allocation requests. For example, the initial allocation request from the initial client may get the entire hierarchical resource tree. In the example, the initial allocation request from an immediate subsequent client may cause a partition of the hierarchical resource tree into two parts. In the example, the initial allocation request from the immediate subsequent client (e.g., third in order) may cause one of the partitions to be partitioned into two parts, etc.

In Step 603, a determination is made whether to rebalance the partitions in accordance with one or more embodiments of the invention. The rebalancing may be performed as a background task. For example, the rebalancing manager may periodically initiate rebalancing of the partitions. By way of an example, the rebalancing may be performed in response to receiving an allocation request from a client. For example, in response to receiving the allocation request, the rebalancing manager may perform the rebalancing for the partition to which the client is assigned. The rebalancing may be performed before or after the allocation request is serviced.

In Step 605, amounts of allocated resources and deallocated resources in the respective partitions are identified. Identifying the amounts may be performed by iterating through the nodes of the partitions and determining the allocation and deallocation state of the resources as designated by the nodes.

In Step 607, the partitions are rebalanced based on the amounts in accordance with one or more embodiments of the invention. Partitions with less than a threshold amount of deallocated resources may have more resources allocated to the partition or one or more clients reassigned away from the partition. In other words, in some embodiments, partitions having heavy use may have clients removed from the partitions and reassigned to partitions having lighter use. By way of another example, a client swap may be performed, whereby clients from a lighter used partition may be swapped with clients from a heavier use partition. By way of another example, the resources may be remapped to different partitions. In one or more embodiments, locking is performed to rebalance the partitions. In other words, a lock may be acquired prior to performing Step 607 and released after performing Step 607. In some embodiments, the lock is acquired prior to performing Step 605. In some embodiments, the lock is acquired after Step 605 is performed.

By partitioning the hierarchical resource tree, one or more embodiments may mitigate or even eliminate bottleneck in acquiring resources. In particular, the clients may be private or virtually private areas from which resources may be allocated. Because the client's may not actually use the resources until the resources are allocated, the resources may be available for use by other clients after the rebalancing is performed.

The following example is for explanatory purposes only and not intended to limit the scope of the invention. The following example is based on the hierarchical resource tree described in U.S. Patent Application No. 2015/0103821, which is incorporated herein by reference.

Figure 71:
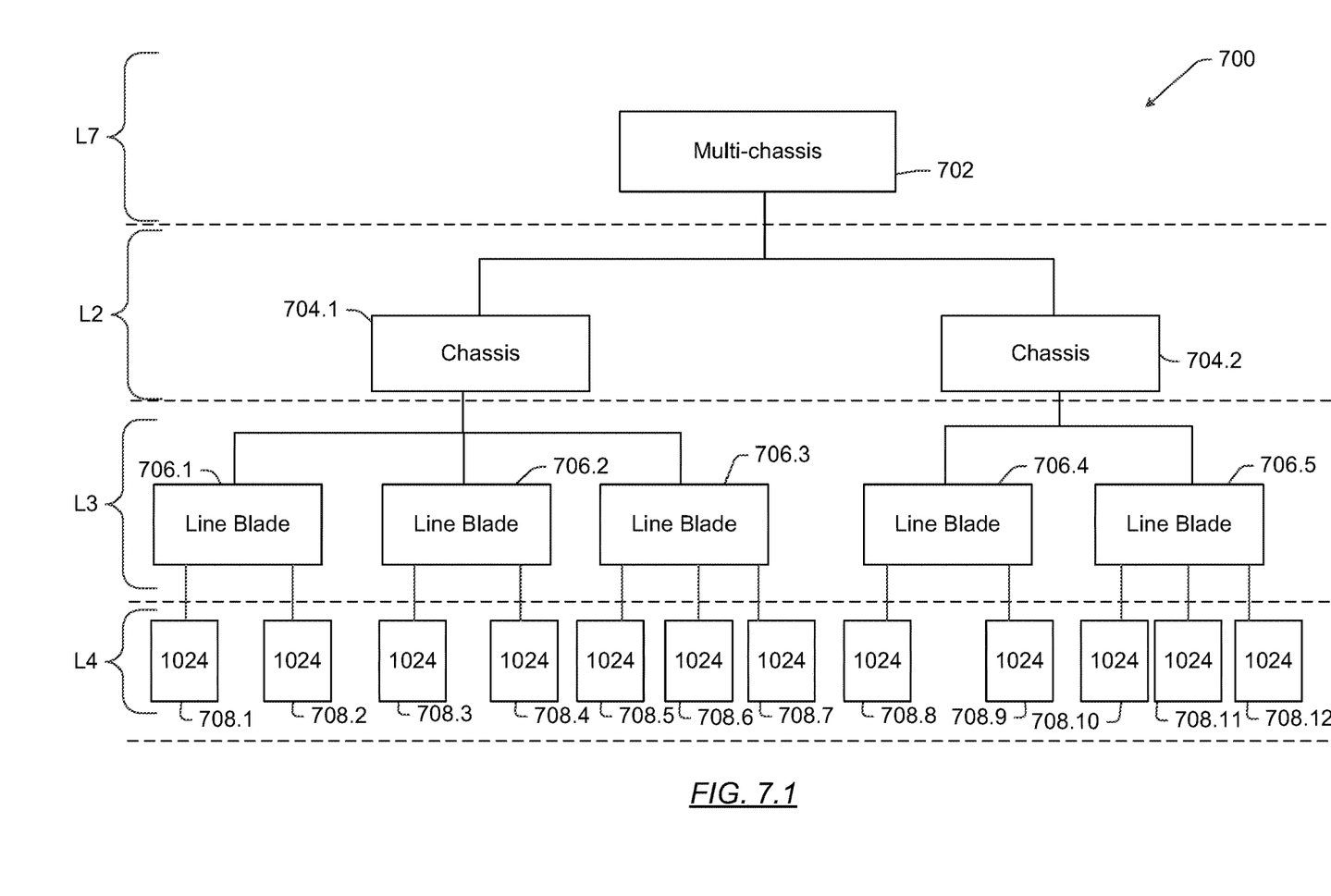

An example hierarchical resource tree for a multi-level switch assembly system (700) is depicted in FIG. 7. As shown, system (700) includes multi-chassis (702) at level L1 (also referred to as the root level in some cases). The multi-chassis (702) in the first level or level L1 can be coupled to one or more second level devices, such as, chassis (704.1-704.2) in a second level or level L2. Multi-chassis (702) can manage resources across the one or more chassis (704.1-704.2) in such a structure, thereby combining the overall pool of resources. For example, some resource allocations may straddle chassis boundaries or in other words, extend across multiple chassis without restrictions based on previously recognized maximum resource capabilities of each chassis. Proceeding further with the description of the tree-structure of system (700), at the next lower level, or third level or level L3, chassis (704.1-704.2) are coupled to one or more third level devices, such as, line blades (706.1-706.5) as shown. Even further below, in a fourth level or level L4 are shown one or more fourth level devices, such as, a hardware table having 1024 entries (708.1-708.12). Rather than tables, the hierarchical resource tree may be for ports, bandwidth, and/or other resources of the switch assembly system.

Figure 72:
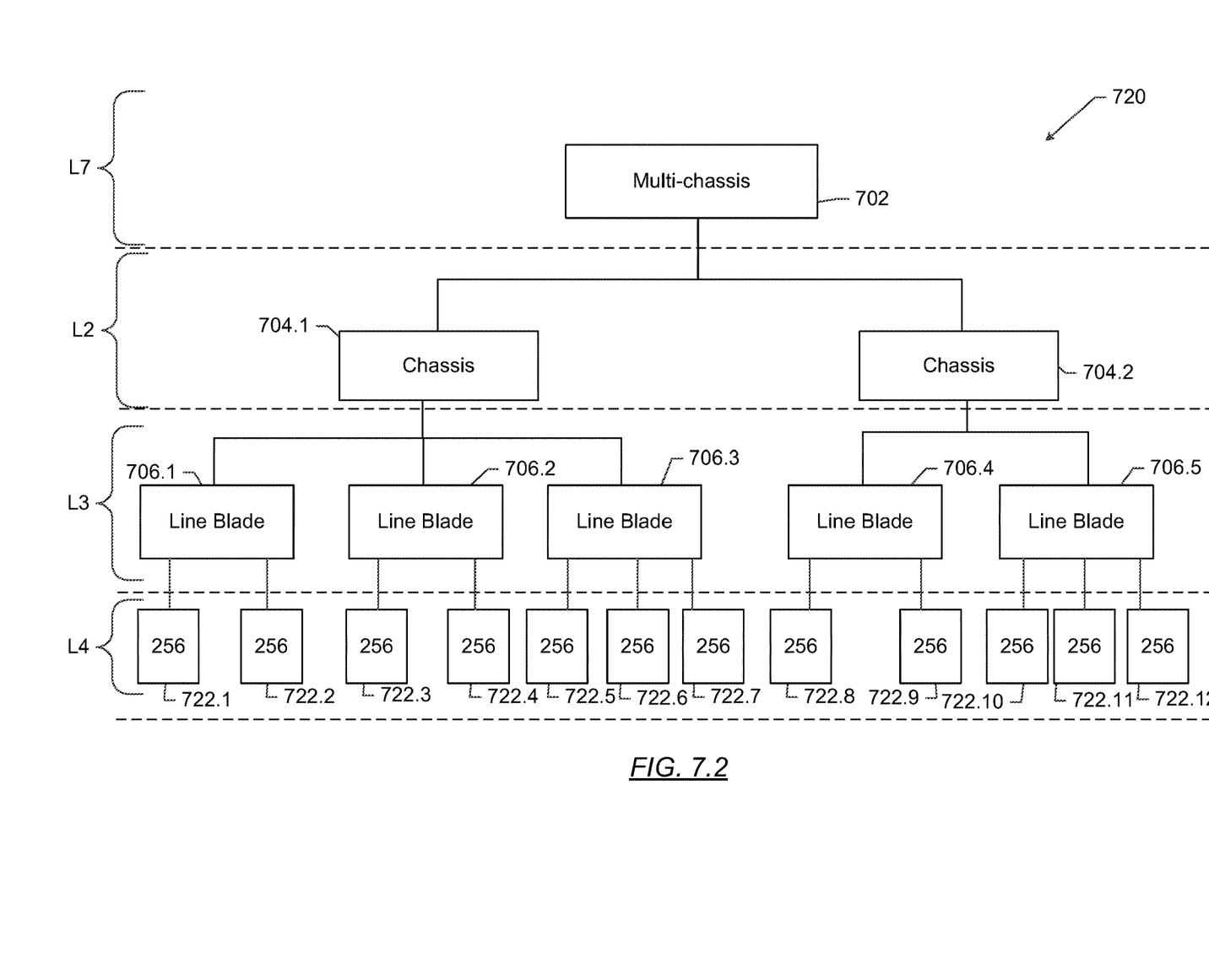

The hierarchical resource tree in FIG. 7.1 may be partitioned into multiple partitions, whereby each partition (720) is shown in FIG. 7.2. As shown in FIG. 7.2, the partitioning partitions the entries of hardware tables on L4 into groups of 256 entries (722.1-722.12). Thus, different clients may concurrently access, through the allocation agents, different partitions of the hierarchical resource tree to be allocated entries in the table from the respective partitions. Accordingly, one or more embodiments may increase the processing power of the computing system by providing a more efficient allocation of resources.

Embodiments of the invention may be implemented on a computing system. Any combination of mobile, desktop, server, router, switch, embedded device, or other types of hardware may be used. For example, as shown in FIG. 8.1, the computing system (800) may include one or more computer processors (802), non-persistent storage (804) (e.g., volatile memory, such as random access memory (RAM), cache memory), persistent storage (806) (e.g., a hard disk, an optical drive such as a compact disk (CD) drive or digital versatile disk (DVD) drive, a flash memory, etc.), a communication interface (812) (e.g., Bluetooth interface, infrared interface, network interface, optical interface, etc.), and numerous other elements and functionalities.

The computer processor(s) (802) may be an integrated circuit for processing instructions. For example, the computer processor(s) may be one or more cores or micro-cores of a processor. The computing system (800) may also include one or more input devices (810), such as a touch-screen, keyboard, mouse, microphone, touchpad, electronic pen, or any other type of input device.

The communication interface (812) may include an integrated circuit for connecting the computing system (800) to a network (not shown) (e.g., a local area network (LAN), a wide area network (WAN) such as the Internet, mobile network, or any other type of network) and/or to another device, such as another computing device.

Further, the computing system (800) may include one or more output devices (808), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (802), non-persistent storage (804), and persistent storage (806). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (800) in FIG. 8.1 may be connected to or be a part of a network. For example, as shown in FIG. 8.2, the network (820) may include multiple nodes (e.g., node X (822), node Y (824)). Each node may correspond to a computing system, such as the computing system shown in FIG. 8.1, or a group of nodes combined may correspond to the computing system shown in FIG. 8.1. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (800) may be located at a remote location and connected to the other elements over a network.

Although not shown in FIG. 8.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (822), node Y (824)) in the network (820) may be configured to provide services for a client device (826). For example, the nodes may be part of a cloud computing system. The nodes may include functionality to receive requests from the client device (826) and transmit responses to the client device (826). The client device (826) may be a computing system, such as the computing system shown in FIG. 8.1. Further, the client device (826) may include and/or perform all or a portion of one or more embodiments of the invention.

The computing system or group of computing systems described in FIGS. 8.1 and 8.2 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 8.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail—such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 8.1, while performing one or more embodiments of the invention, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 8.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 8.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions present only a few examples of functions performed by the computing system of FIG. 8.1 and the nodes and/or client device in FIG. 8.2. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for resource management comprising:
   receiving, from a first client, a first allocation request for a first resource;
   assigning, to the client, a first partition of a hierarchical resource tree, wherein the first partition is in a plurality of partitions of the hierarchical resource tree;
   identifying a first deallocated resource in the first partition;
   determining whether the first client is the only client or one of a plurality of clients assigned to the first partition;
   when the first client is the only client assigned to the first partition, allocating, to the first client, the first deallocated resource from the first partition to create a first allocated resource without a locking mechanism;
   when the first client is one of the plurality of clients assigned to the first partition, causing the locking mechanism on the first partition and allocating, to the first client, the first deallocated resource from the first partition to create the first allocated resource; and
   processing, concurrently with the first client, one or more additional clients whereby the one or more additional clients are at separate partitions of the hierarchical resource tree from the first partition.

2. The method of claim 1, further comprising:
receiving, from the first client, a second allocation request for a second resource;
identifying, based on being assigned to the first client, the first partition;
identifying a second deallocated resource in the first partition; and
allocating, to the first client, the second deallocated resource from the first partition to create a second allocated resource.

3. The method of claim 2, further comprising:
receiving, from a second client, a third allocation request for a third resource;
identifying, based on being assigned to the second client, a second partition in the plurality of partitions of the hierarchical resource tree, the second partition being disjoint from the first partition;
identifying a third deallocated resource in the second partition; and
allocating, to the second client, the third deallocated resource from the second partition to create a third allocated resource,
wherein allocating the third deallocated resource is performed without a locking mechanism.

4. The method of claim 3, wherein the second partition is allocated to a strict subset of a plurality of clients of the hierarchical resource tree, and wherein the allocating of the third deallocated resource comprises acquiring a lock for the second partition.

5. The method of claim 3, further comprising:
performing a rebalancing of the first partition and the second partition.

6. The method of claim 5, wherein the rebalancing comprises:
re-assigning a subset of a plurality of deallocated resources from the second partition to the first partition.

7. The method of claim 5, wherein the rebalancing comprises:
re-assigning the first client to the second partition.

8. The method of claim 5, wherein the rebalancing is performed in the background.

9. The method of claim 5, wherein the rebalancing is performed in response to the second allocation request for the plurality of resources.

10. The method of claim 1, wherein the plurality of partitions is stored in shared memory.

11. A system for resource management comprising:
a plurality of resources;
a data repository configured to store a hierarchical resource tree, wherein the hierarchical resource tree is partitioned into a plurality of partitions; and
a computer processor operatively connected to the plurality of resources and the data repository, and configured to
receive, from a first client, a first allocation request for a first resource,
assign, to the client, a first partition of the hierarchical resource tree, wherein the first partition is in a plurality of partitions of the hierarchical resource tree,
identify a first deallocated resource in the first partition, and
determine whether the first client is the only client or one of a plurality of clients assigned to the first partition;
when the first client is the only client assigned to the first partition, allocate, to the first client, the first deallocated resource from the first partition to create a first allocated resource without a locking mechanism;
when the first client is one of the plurality of clients assigned to the first partition, cause the locking mechanism on the first partition and allocate, to the first client, the first deallocated resource from the first partition to create the first allocated resource; and
process, concurrently with the first client, one or more additional clients whereby the one or more additional clients are at separate partitions of the hierarchical resource tree from the first partition.

12. The system of claim 11, further comprising:
a rebalancing manager configured to rebalance the plurality of partitions.

13. A non-transitory computer readable medium for resource management comprising computer readable program code for:
receiving, from a first client, a first allocation request for a first resource;
assigning, to the client, a first partition of a hierarchical resource tree, wherein the first partition is in a plurality of partitions of the hierarchical resource tree;
identifying a first deallocated resource in the first partition; and
determining whether the first client is the only client or one of a plurality of clients assigned to the first partition;
when the first client is the only client assigned to the first partition, allocating, to the first client, the first deallocated resource from the first partition to create a first allocated resource without a locking mechanism;
when the first client is one of the plurality of clients assigned to the first partition, causing the locking mechanism on the first partition and allocating, to the first client, the first deallocated resource from the first partition to create the first allocated resource; and
processing, concurrently with the first client, one or more additional clients whereby the one or more additional clients are at separate partitions of the hierarchical resource tree from the first partition.

14. The non-transitory computer readable medium of claim 13, further comprising computer readable program code:
receiving, from the first client, a second allocation request for a second resource;
identifying, based on being assigned to the first client, the first partition;
identifying a second deallocated resource in the first partition; and
allocating, to the first client, the second deallocated resource from the first partition to create a second allocated resource.

15. The non-transitory computer readable medium of claim 14, further comprising computer readable program code:
receiving, from a second client, a third allocation request for a third resource;
identifying, based on being assigned to the second client, a second partition in the plurality of partitions of the hierarchical resource tree, the second partition being disjoint from the first partition;
identifying a third deallocated resource in the second partition; and allocating, to the second client, the third deallocated resource from the second partition to create a third allocated resource.

16. The non-transitory computer readable medium of claim 15, further comprising computer readable program code:

performing a rebalancing of the first partition and the second partition.

\* \* \* \* \*